United States Patent [19]

Aidlin et al.

[11] Patent Number: 4,844,233

[45] Date of Patent: Jul. 4, 1989

[54] BOTTLE ORIENTATION APPARATUS AND METHOD

[76] Inventors: Stephen H. Aidlin, 5208 Lake Village Dr., Sarasota, Fla. 33580; Robert V. Ledwith, 6210 99 St. E., Bradenton, Fla. 34202

[21] Appl. No.: 121,190

[22] Filed: Nov. 16, 1987

[51] Int. Cl.⁴ .............................................. B65G 47/24
[52] U.S. Cl. .................... 198/394; 198/399; 198/400
[58] Field of Search .......................... 198/394, 396–400

[56] References Cited

U.S. PATENT DOCUMENTS

| | | | |
|---|---|---|---|
| 3,339,702 | 9/1967 | Novak et al. | 198/400 |
| 3,624,773 | 11/1971 | Krooss | 198/397 |
| 4,463,846 | 8/1984 | Ionescu | 198/399 |

Primary Examiner—Joseph E. Valenza
Attorney, Agent, or Firm—Dominik, Stein, Saccocio, Reese, Colitz & Van Der Wall

[57] ABSTRACT

A bottle orientation system for orientating and uprighting a horizontal flow of bottles being conveyed by co-acting endless belt conveyors. The system includes a raised kick-up stop and knock-down stop for positioning all bottles in a bottom-first position between the belts. A raised platform then rights the bottles between the belts.

11 Claims, 3 Drawing Sheets

BOTTLE ORIENTATION APPARATUS AND METHOD

BACKGROUND OF THE INVENTION

1. Field of the Invention

This invention relates to bottle aligners and bottle orientation machines. More particularly, this invention relates to automatic bottle orientation machines in which a continuous flow of aligned but disoriented bottles is automatically oriented neck end up onto a conveyor.

2. Description of the Background Art

A wide variety of types, shapes and sizes of bottles are currently in use for packaging of substances. One of the most common shapes of a bottle for liquids includes a main body portion and a neck portion through which the liquid contents are poured from and into the bottle. For efficient processing such bottles must be oriented so as to align them in a vertical neck-up position with minimum breakage of bottles if they consist of glass or other brittle material.

In known arrangements for orienting bottles, necked bottles are received in a horizontal position and then fed along a predetermined path so as to assume a vertical position for further processing, filling, etc. One of such arrangements is disclosed, for example, in U.S. Pat. No. 4,146,124 in which bottles are fed aligned in a side by side fashion. This does not preclude skewing of bottles as they are fed along the feeding path. The above-mentioned deficiency can lead to costly and time consuming jam up and break down of the arrangement.

In other known arrangements, the stream of horizontally aligned bottles is captured by a rotating vertical wheel and passed alongside of a snare. The snare attempts to snare the end of the bottle and orient it to an upright position. If the approaching bottle is being fed neck first, the snare grasps the necked end of the bottle and orients it to an upright position. Conversely, if the bottle is being fed bottom first, the snare fails to grasp the end of the bottle to orient it. The bottle is then ejected and re-fed into the wheel. Continuous operation eventually results in upright orientation of all the bottles albeit statistically one half of the bottles must be repeatedly refed into the wheel until proper neck first positioning in the wheel is attained.

Still further known arrangements are disclosed in U.S. Pat. Nos. 3,831,738, 3,722,659, 3,338,373 and 3,295,659 assigned to the same assignee as this invention. Of these, U.S. Pat. Nos. 3,722,659 and 3,831,738 achieve vertical orientation of the bottles by moving the bottles upwardly along a graduated center rail or two side rails which forces the necked end of the bottle upwardly until the bottle is fully erect. U.S. Pat. Nos. 3,295,659 and 3,338,373 disclose orientation arrangements in which the bottles fall through a chute, bottom end first, onto a conveyor for later processing.

Each of the various orientation arrangements disclosed above has disadvantages associated therewith including limitations of the style and type of bottles capable of being oriented and the speed and reliability of operation.

Therefore, it is an object of this invention to provide an apparatus and a method which overcomes the aforementioned inadequacies of the prior art devices and provides an improvement which is a significant contribution to the advancement of bottle orientation art.

Another object of the invention is to provide an improved bottle orientation machine which operates to automatically orient and right a continuous flow of bottles onto a conveyor such that the rate of flow of the bottles is not reduced.

Another object of the invention is to provide an improved bottle orientation machine which may be easily incorporated into existing lines of packaging machinery.

Another object of the invention is to provide an improved bottle orientation machine which is economical to manufacture and therefore cost effective over existing orientation machines.

Another object of the invention is to provide an improved bottle orientation machine which may be operated at speeds and throughput greater than that of existing orientation machines with minimal misfeeds or jams.

Another object of the invention is to provide an improved bottle orientation machine which comprises a simple design thereby significantly increasing the life of the machine while reducing the maintenance costs.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a bottle orientation machine operable to orient and right continuous fed necked bottles. More specifically, the bottle orientation machine basically comprises an infeed station having a pair of lateral rotating belts whose axes of rotation are vertically disposed such that the belts are positioned to engage the aligned, horizontal infeed of the containers therebetween from a conventional infeed conveyor. A raised kick-up stop is positioned between the lateral rotating belts beginning a distance downline of the belts (substantially greater than the diameter of the bottles). The stop preferably comprises a small rotatable belt driven wheel. The kick-up stop is raised above the level of the infeed conveyor by a distance substantially equal to one-half the diameter of the bottle minus one half the diameter of the neck of the bottle. A knock-down stop is positioned still further downline and above the lower rotating belts. Finally, a raised central platform is positioned between the lower rotating belts further downline of the knock-down stop. Another pair of lateral rotating belts is positioned above and partially overlapping the lower rotating belts to additionally engage the bottles flowing therebetween for further transport downline.

In operation, the bottles are infed via the infeed conveyor either neck first or bottom first into the infeed station of the bottle orientation machine. With regard to a bottle which is fed neck first, the bottle is grasped by the lower rotating belts and pulled over the kick-up stop whereupon the bottle is gradually pivoted upwardly to a partially erect position. Further downline movement via the lower belts causes the bottle to be impacted against the knock-down stop positioned overhead. Upon impact, the bottle is flipped over onto itself to a substantially horizontal bottom-first position between the lower rotating belts for further transport downline.

With regard to a bottle fed bottom first into the infeed station of the bottle orientation machine of the invention, the bottle is conveyed via the infeed conveyor and the lower rotating belts until the bottom edge of the bottle engages the kick-up stop. However, since the stop includes a rotating belt, the bottle (moving bottom first) simply rides over the kick-up stop and continues to travel downline bottom-first.

The bottom-first moving bottles remain grasped by the lower lateral rotating belts and are forced against the raised central platform whereupon the bottom edge of the bottle pivots about the leading edge of the platform to an upright position. When the bottle is fully righted, the bottle moves further downline to be grasped between the upper lateral belts and further steadied thereby. The bottle is then transported to the outfeed conveyor.

It should be apparent from the foregoing description of the operation of the invention, that the bottles are oriented and righted as fast as they are infed into the infeed station via the infeed conveyor, and further that the invention may be incorporated into virtually any type of packaging equipment line without significant alterations to the line. However, this invention also comprises a unique infeed conveyor which receives the bottles from a bin or other bulk supply, and then lines up the bottles, coaxially with one another, horizontally onto the infeed conveyor either bottom or neck first for flow into the bottle orientation machine.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
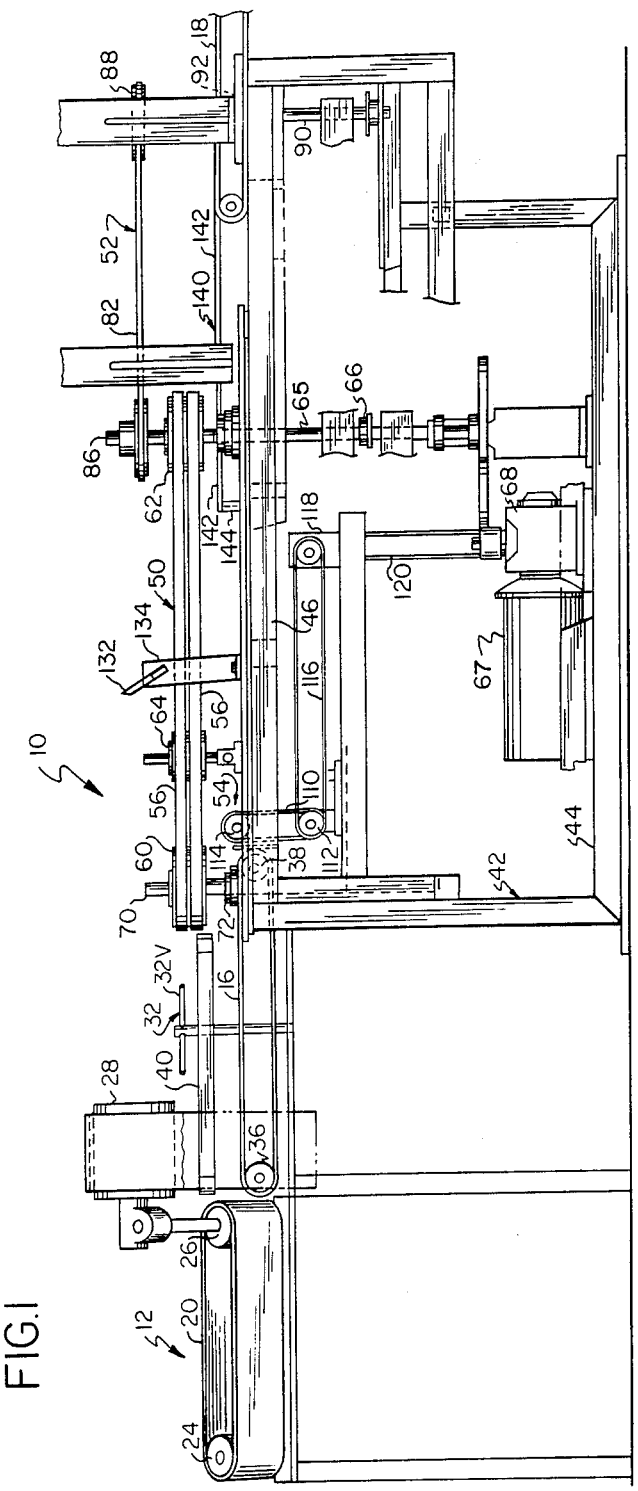
FIG. 1 is a side view of the bottle aligner and bottle orientation machine of the invention, showing the arrangement of the infeed and outfeed conveyors, both pairs of lateral belts, the kick-up stop, knock-down stop, and the raised central platform.
Figure 2:
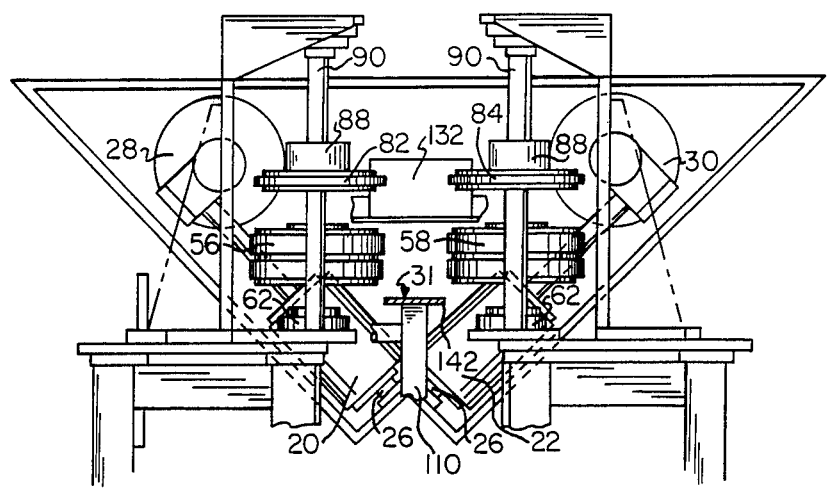
FIG. 2 is a rear view of the bottle orientation machine of the invention showing the spaced apart relationship of both pairs of lateral belts with the kick-up stop positioned therebetween.

Referring to FIG. 1, the invention comprises a bottle orientation machine generally indicated by the numeral 10. The invention also comprises a bottle aligner generally indicated by the numeral 12. The bottle aligner 12 is positioned to receive a supply of necked bottles 14 from a bin (not shown) or the like and align the bottles 14 coaxially with respect to one another. The bottles 14 then flow onto an infeed conveyor 16 which infeeds the bottles 14 into the bottle orientation machine 10 of the invention. The bottle orientation machine 10 operates to orient and right the bottles 14 to an upright position irrespective of whether the bottles 14 are infed into the machine 10 bottom first or neck first. The uprighted bottles 14 are then outfed from the machine 10 via an outfeed conveyor 18.

More particularly, the bottle aligner 12 of the invention comprises a pair of rotating belts 20 and 22 travelling in the same direction and positioned in a V-configuration with respect to one another. Each belt 20 and 22 is entrained about an idler pulley 24 and a drive pulley 26 powered by electric motors 28 and 30. The speed of rotation of each of the belts 20 and 22 is independently and selectively controlled such that the belts 20 and 22 may be controlled to operate at different speeds. The bottle aligner 12 may include other configurations such as U-configurations and the equivalent.

As the bottles 14 flow into the bottle aligner 12 of the invention, the bottles 14 position themselves in the apex formed by the V-configuration of the rotating belts 20 and 22. Bottles 14 which happen to fall lengthwise into the apex 31 formed by belts 20 and 22 are already coaxially aligned with one another and thus are simply transported downline to the infeed conveyor 16. Other bottles 14 which fall into the apex 31 in an upright, tilted or canted position, are forced to a longitudinal position in the apex 30 due to the non-identical rotational speeds of the belts 20 and 22. Once the bottles 14 have been forced to a longitudinal position between the belts 20 and 22, the now coaxially aligned bottles 14 are transported downline to the infeed conveyor 16. A kick-out mechanism, generally indicated by numeral 32 and having a plurality of rotatable, semi-rigid vanes 32V, may be provided to kick out erect bottles 14 which may not have been forced into a horizontal position by the bottle aligner. The rejected bottles may then be fed into a non-illustrated ladder-type elevator or the like. Alternatively, an elevated gate (not shown) may be positioned over the output of the bottle aligner 12 to tip over any erect bottles 14 being outfed therefrom.

The infeed conveyor 16 simply comprises a belt 34 entrained about an idler pulley 36 and a drive pulley 38 powered by motor (not shown). A pair of opposing guide rails 40 are positioned above the belt 34 to assure that the bottles 14 remain horizontally aligned on belt 34 during transport.

The bottle orientation machine 10 of the invention comprises a substantially rectangular framework 42 having a base portion 44 and a table portion 46. Positioned on the table portion 46 of the framework 42 is a lower rotating belt assembly 50, an upper rotating belt assembly 52 and a raised kick-up stop 54 (see FIG. 1).

More particularly, the lower rotating belt assembly 50 comprises a pair of belts 56 and 58 each operatively disposed between an idler pulley 60 and a drive pulley 62. An adjustable tension idler pulley 64 is provided to properly tension the belts 56 and 58.

Each drive pulley 62 is powered via drive shaft 65, interconnected by engaged spur gears 66. One of the drive shafts 65 is driven by drive motor 67 having a adjustable reducer 68. Similarly, idler pulley 60 is supported by idler shaft 70 mounted to table 46 by journal bearing 72.

The drive shaft 64 and idler shafts 70 of the lower rotating belt assembly 50 may be mounted upon a carriage, to allow inward and outward adjustment of the belts 56 and 58 about the center-line of the flow of the bottles 14 so that the bottle orientation machine 10 can be adjusted to accommodate runs of bottles of differing diameters.

The upper rotating belt assembly 52 similarly comprises a pair of belts 82 and 84 each positioned to rotate about drive and idler pulleys 86 and 88. The drive pulleys 86 are mounted on the drive shafts 64 of the lower rotating belt assembly 50 to be driven thereby. The idler pulleys 88 are mounted to the table 46 by means of idler shafts 90 and journal bearings 92. The idler shafts 90 of the upper rotating belt assembly 52 may similarly be mounted upon the carriage for adjustment for different diameter bottles.

The raised kick-up stop 54 is positioned between the lower rotating belt assembly 50 in line with the flow of the bottles 14. The kick-up stop 54 comprises a continuous belt 110 entrained about drive pulley 112 and idler pulley 114. The idler pulley 114 is positioned inwardly relative to the front edge of the lower rotating belt assembly 50 by a distance substantially equal to the diameter of the bottles 14. Additionally, drive pulley 112 is preferably positioned substantially below the front end of the lower counter rotating belt assembly 50.

The drive pulley 112 of the raised kick-up stop 54 is powered by means of a belt 116 and right angle drive 118 driven by a belt 120 entrained about a take-off of reducer 68.

The raised kick-up stop 54 is vertically adjustable to allow the kick-up stop 54 to be raised and lowered relative to the level of the infeed conveyor 16. Preferably, the raised kick-up stop 54 is adjusted in height to be approximately equal to one-half of the difference in diameter between the body and neck portions of the bottles 14.

A knock-down stop 132 is positioned downline of the of the raised kick-up stop 54. The stop 132 simply comprises a flat metal plate adjustably mounted via bracket 134 above the path of flow of the bottles moving below. Stop 132 is preferably canted toward the input of the machine at an acute angle as shown. Knock-down stop 132 is positioned sufficiently downline of the kick-up stop 54 such that a neck-first bottle 14 impacts the flat underside of the canted stop 132 after being pivoted upwardly by the kick-up stop 54. Upon impact, bottle 14 is flipped over onto itself to now travel further downline bottom first. It is noted that bottles 14 originally traveling bottom first are not normally kicked up by the kick-up stop 54 and therefore do not impact the knock-down stop 132. Thus, originally bottom first moving bottles 14 simply move further downline bottom first.

A raised central platform 140 is positioned downline of the knock-down stop 132 for erecting the bottom first moving bottles to an upright position. Specifically, central platform simply comprises a flat plate 142 horizontally disposed between the lower rotating belts 50 in a raised configuration by means of adjustment brackets 144. Thus, adjustment of brackets 144 determines the height of the platform 140 such that the leading edge 146 of the platform 140 is raised sufficiently high to partially obstruct the flow of bottom moving bottles 14. Consequently, the bottom edge of either of the bottles 14 engage the leading edge 146 of the platform 140 allowing the lower rotating belts 50 to pivot the bottles over the leading edge 146 to an upright vertical position onto the platform 140 itself. The now-erected bottles are then transported further downline by the lower and then the upper rotating belt assemblies 50 and 52.

Figure 4A:
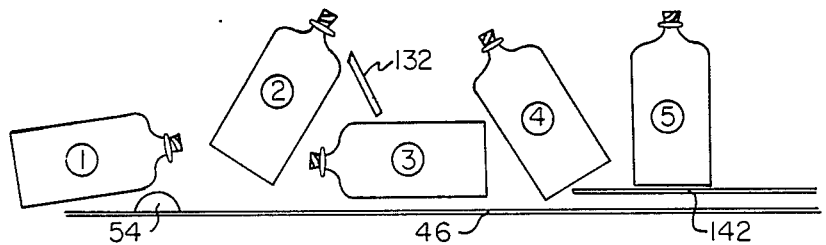
FIGS. 4a and 4b schematically illustrate the erection of the neck first moving bottles and the bottom first moving bottles.
Figure 4B:
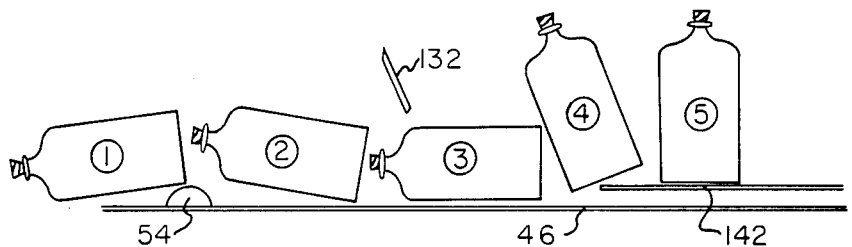
Figure 3:
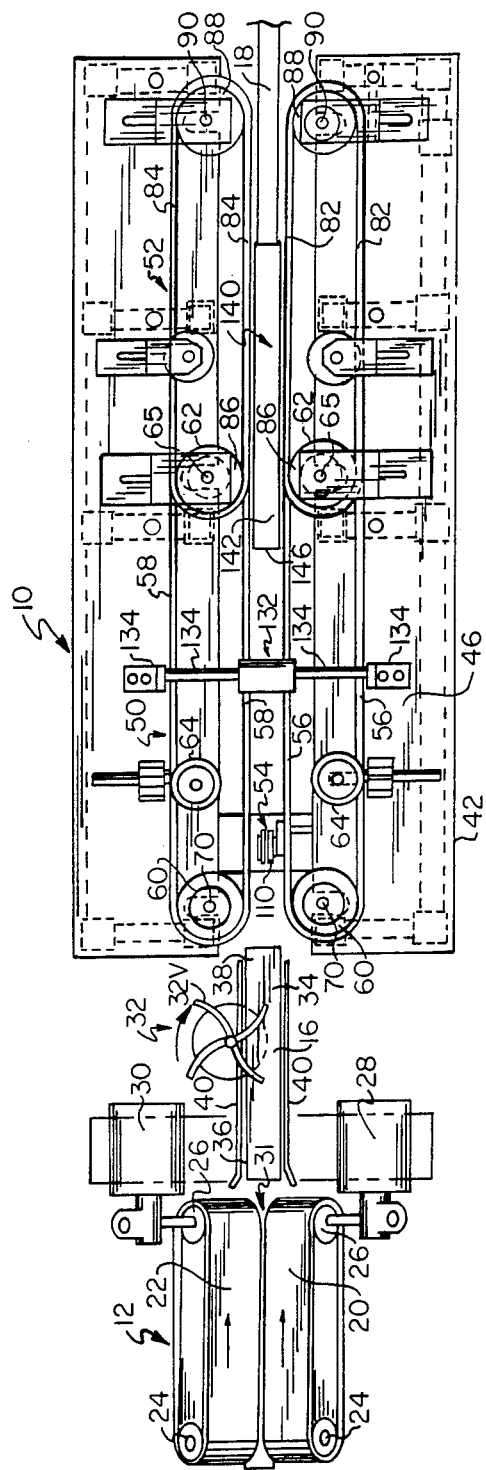
FIG. 3 is a top view illustrating the bottle aligner of the invention and an infeed and an outfeed conveyor to the bottle orientation machine of the invention.

The complete orientation operation may be summarized as follows with reference to FIGS. 4a and 4b. The bottles are coaxially aligned by means of the bottle aligner 12 and then fed via the infeed conveyor 16 into the bottle orientation machine 10 either neck first or bottom first. With regard to neck first bottles 14, the neck of the bottle 14 slides over kick-up stop 54 as the body portion of the bottle 14 is grasped by the lower rotating belt assembly 50 (see FIG. 4a). The bottle 14 is therefore tilted upwardly for further transport downline until the bottle 14 impacts the knock-down stop 132. Upon impact, the bottle is flipped over to now travel horizontally, bottom first. With regard to bottom first bottles 14, the bottom of the bottle 14 engages stop 54 and simply rides over the same thereby remaining horizontal (see FIG. 4b). In the event the bottom of the bottles 14 begins to pivot about stop 54 and raise, knock-down stop 132 promptly knocks it down to its bottom first horizontal position.

All of the now bottom first moving bottles then impact the leading edge 146 of the platform 140 and are pivoted upwardly to an erect position. The erect bottles 14 are then outfed by means of the upper rotating belt assembly 52 onto the outfeed conveyor 18.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,
What is claimed is:

1. A bottle orientation machine for orientating and uprighting a continuous horizontal flow of bottles moving along their axes, each bottle having a neck, bottom and body therebetween, comprising in combination:
   a framework;
   a lower rotating belt assembly aligned with the flow of the bottles into the machine, said lower rotating belt assembly comprising a pair of belts positioned about a drive pulley and an idler pulley in a spaced apart relationship to receive and grasp the bottles flowing therebetween along their axes;

a raised kick-up stop aligned with the flow of bottles and positioned laterally between and beneath said belts of said lower rotating belt assembly and below the axes of the bottles;

a knock-down stop positioned laterally between and above said belts of said lower rotating belt assembly downstream of said raised kick-up stop; and a raised platform positioned laterally between and below said belts of said lower rotating belt assembly and downstream of said knock-down stop;

said kick-up stop and said knock-down stop being positioned from each other by a predetermined distance whereby a neck-first flowing bottle is grasped by said lower rotating belt assembly, rides over said kick-up stop, its leading end raises, contacts said knock-down stop and is reversed and fed therefrom bottom-first along its axis and is then righted to an upright position and whereby the bottom of a bottom-first flowing bottle engages said kick-up stop and its leading end raises but insufficiently for contacting said knock-down stop and is then righted to an upright position.

2. The machine as set forth in claim 1, wherein the height of said raised kick-up stop is substantially equal to one-half of the difference in the diameters of the neck and body of the bottles.

3. The machine as set forth in claim 1, further including an upper rotating belt assembly aligned with the flow of the bottles into the machine, said upper rotating belt assembly comprising a pair of belts positioned about a drive pulley and an idler pulley in a spaced apart relationship to receive and grasp the bottles flowing therebetween.

4. The machine as set forth in claim 1, wherein said raised kick-up stop is vertically adjustable in height.

5. The machine as set forth in claim 3, further including means for adjusting the distance between said belts of said lower rotating belt assembly.

6. The machine as set forth in claim 5, further including means for adjusting the distance between said belts of said upper rotating belt assembly.

7. The machine as set forth in claim 1, further including a bottle alignment machine operable to longitudinally align the bottles onto an infeed conveyor.

8. The machine as set forth in claim 7, wherein said bottle alignment machine comprises a pair of rotating belts positioned in a V-configuration relative to one another.

9. The machine as set forth in claim 8, wherein the speed of rotation of said belts of said bottle alignment machine are independently adjustable.

10. The machine as set forth in claim 1, wherein said kick-up stop comprises wheel means.

11. The machine as set forth in claim 10, wherein said wheel means comprises drive and idler pulleys with a belt rotatably mounted therebetween.

* * * * *